Herbert Rees
INVENTOR.

BY Karl G. Ross
Attorney

Dec. 9, 1969                    H. REES                    3,482,284

DUAL INJECTION-MOLDING MACHINE

Filed Feb. 23, 1967                    4 Sheets-Sheet 3

Herbert Rees
INVENTOR.

BY

Karl F. Ross
Attorney

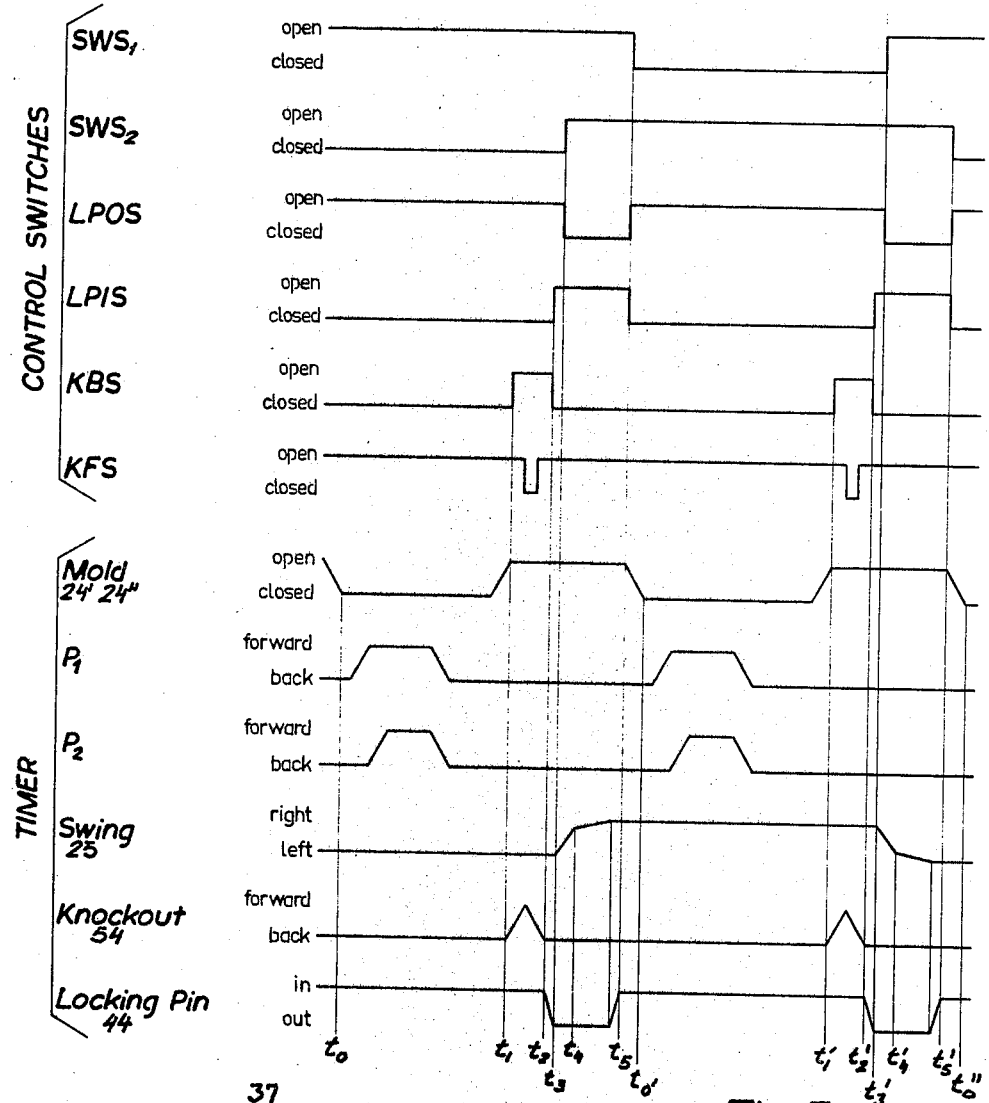
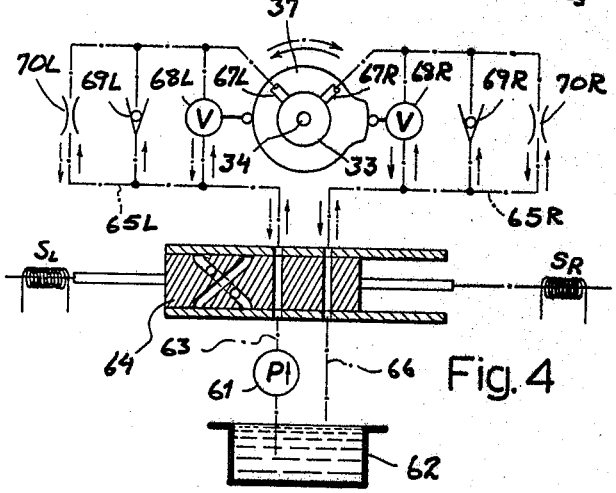
Fig. 5
Fig. 4
Herbert Rees
INVENTOR.
BY
Karl F. Ross
Attorney

United States Patent Office 3,482,284
Patented Dec. 9, 1969

3,482,284
DUAL INJECTION-MOLDING MACHINE
Herbert Rees, Willowdale, Ontario, Canada, assignor to Husky Manufacturing & Tool Works Ltd., Toronto, Ontario, Canada, a corporation of Canada
Filed Feb. 23, 1967, Ser. No. 618,097
Int. Cl. B29f *1/022, 1/14*
U.S. Cl. 18—30      11 Claims

ABSTRACT OF THE DISCLOSURE

Injection-molding machine designed for making composite (e.g., two-color) plastic articles, comprising two substantially fixed mold portions and two movable mold portions swingably mounted on a common carrier for interchangeably confronting the two fixed mold portions to define therewith a pair of molds adapted to receive, substantially simultaneously, different but mutually compatible (e.g., distinctively colored) plastic masses from respective injection pistons. The movable mold portions are provided with recesses or other article-retaining formations so that each of them, after successive confrontations of the two fixed mold portions, holds a composite article which is dislodged once per cycle by means of an ejector aligned with one of the two fixed mold portitons so as to be alternately engageable with the two movable mold portions.

---

My present invention relates to an injection-molding machine with separable mold portions and an injection piston or the like, e.g. as described in my U.S. Patents Nos. 3,117,348 and 3,254,371, which operates to introduce moldable plastic material into one or more cavities of a closed mold.

An object of my invention is to provide a machine of this type adapted for high-speed injection molding of composite articles from different but mutually compatible materials, e.g. thermoplastics of different colors.

A more specific object of the present invention is to provide a machine of this type which is compact, efficient and virtually foolproof in its operation.

These objects are realized, pursuant to the instant invention, by the provision of a first and a second mold portion disposed alongside each other, these mold portions being substantially stationary although they may have a limited axial mobility so as to be displaceable by co-operating movable mold portions, upon closure of the respective molds, for the purpose of actuating a safety switch as described in my prior patents identified above. The movable mold portions, according to an important feature of my invention, coact interchangeably with the substantially fixed mold portions and are mounted on a common carrier which, after each injection cycle, is operable in an open position of the two molds to reverse the relationship between the movable and the stationary mold portions whereby each movable mold portion alternately confronts the two stationary mold portions to define therewith an injectiton mold of at least one cavity. The movable mold portions are provided with article-retaining formations, such as recesses or cores, which, in a first stage of the molding of a composite article, help form one part of such article and which thereafter transfer this part to the cavity of the other mold where the article is completed in a second stage. At the end of this second stage, an ejector alternately alignable with the two interchangeable mold portions, and preferably positioned in line with the second fixed mold portion, is actuated to remove the finished composite article from the movable mold portion on which it is carried; no such ejector goes into action at the other movable mold portion which at this time carries only a partially molded article.

Advantageously, in accordance with a further feature of my invention, the carrier for the interchangeable mold portions is an arm swingable about an axis located between the two fixed mold portions, e.g. about a tie bar which together with other tie bars serves for the linear guidance of a mold-plate support toward and away from the fixed mold portions. The carrier, when pivotally connected with this support, is thus axially movable for opening and closing of the molds as well as transversely swingable between two diametrically opposite positions. In these terminal positions the carrier arm is held, relatively to its support, by a retractable locking pin which preferably operates two switches of the microsensitive type to allow the start of an injection cycle only in its engaged position and to permit a swing of the arm only in its retracted position. A similar switch may be provided at the ejector to prevent a swing of the arm until the dislodgment of the composite article from its movable mold portion is completed.

The foregoing and other features of my invention will become more fully apparent from the following detailed description of a preferred embodiment, reference being made to the accompanying drawing in which:

FIG. 4 is a hydraulic circuit diagram for a mold-swinging mechanism forming part of the machine of FIGS. 1–3; and FIG. 5 is a set of graphs illustrating the timing sequence of the operation of the principal elements shown in FIGS. 1–3.

Figure 1:
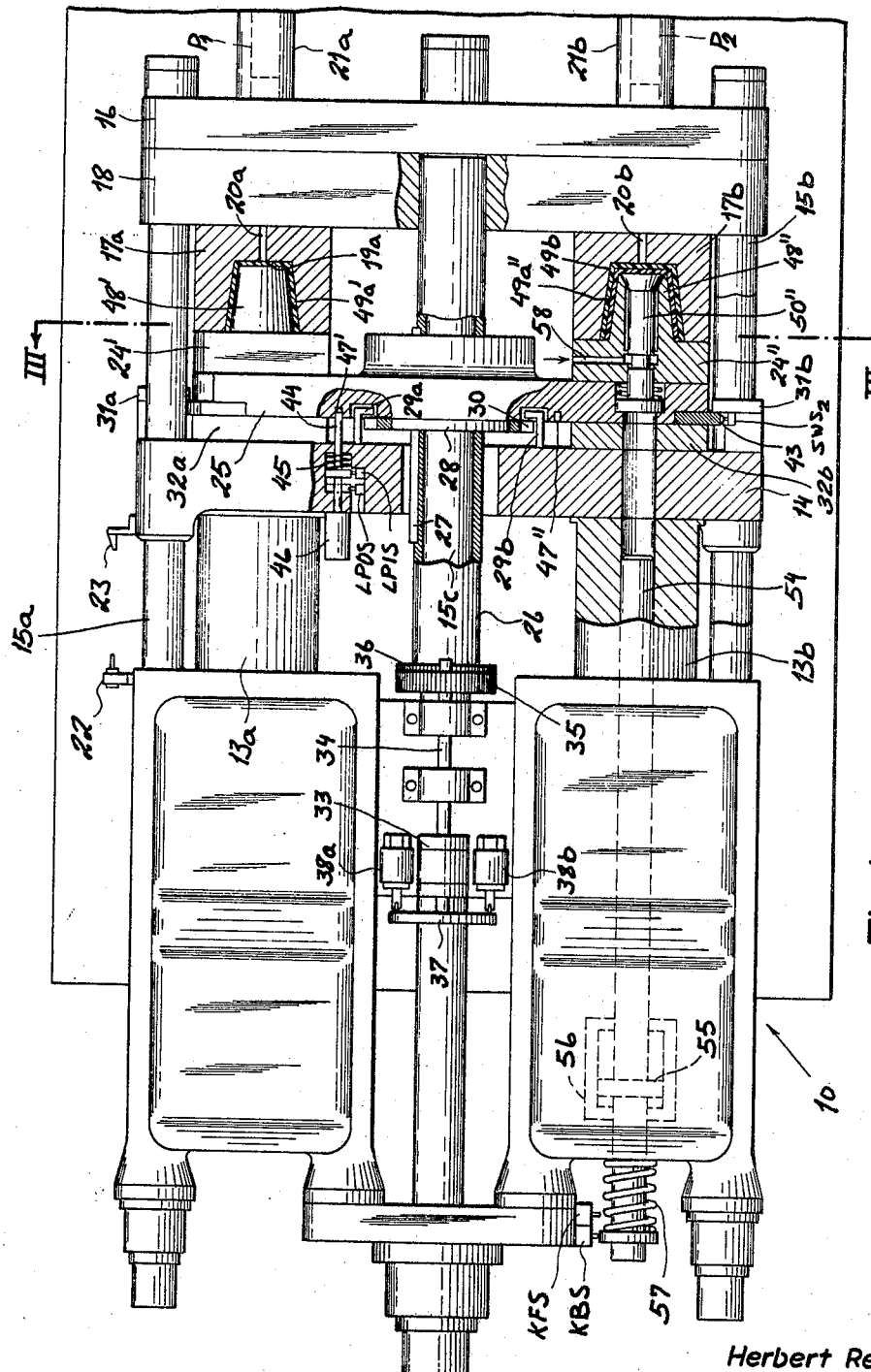
FIG. 1 is a top view (parts broken away) of a mold assembly and associated elements in a dual injection-molding machine according to the invention.
Figure 2:
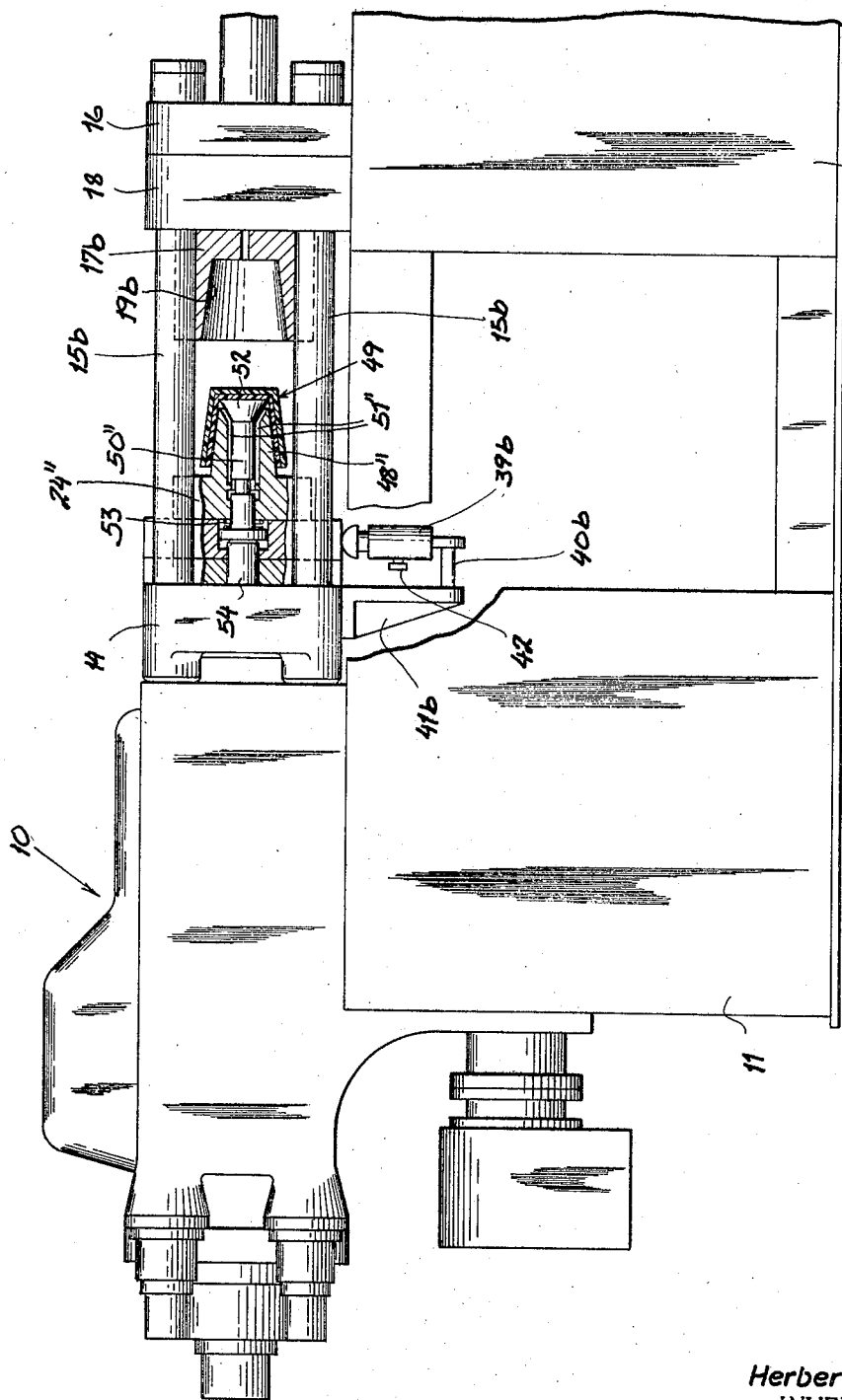
FIG. 2 is a side-elevational view, also with parts broken away, of the machine shown in FIG. 1.
Figure 3:
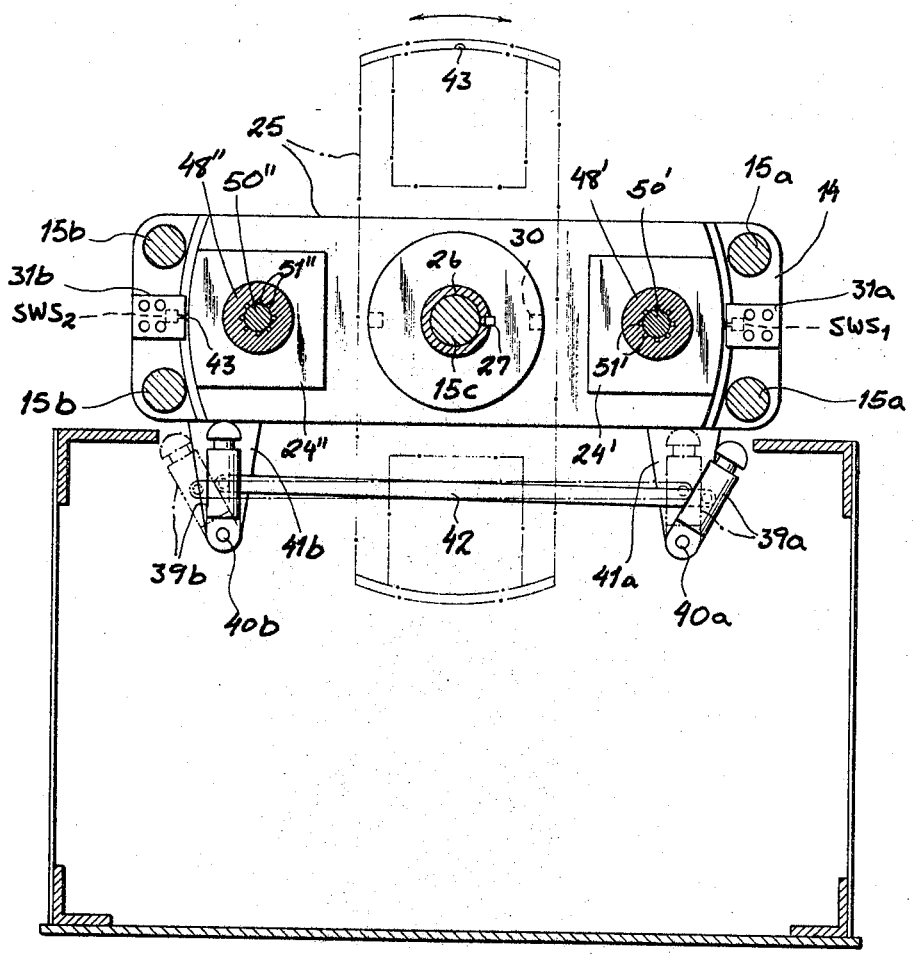
FIG. 3 is a cross-sectional view taken on the line III—III of FIG. 1.

The molding machine shown in FIGS. 1–3 comprises a frame 10 forming a pair of housings 11, 12 for respective drive mechanisms of conventional construction, not further illustrated, which may be generally similar to the crank drives shown in my two aforementioned U.S. patents. The mold drive in housing 11 serves to reciprocate a pair of rams 13a, 13b rigid with a mold plate 14 which is guided for horizontal motion on two pairs of outer tie bars 15a, 15b and a central tie bar 15c. These tie bars terminate at a stationary backing plate 16 to which two mold portions 17a and 17b are secured with the aid of a common supporting plate 18; plate 18 may be free to separate slightly, under the pressure of springs not shown, from backing plate 16 to actuate a non-illustrated switch indicating proper mold closure, as described in my prior patents, preparatorily to the injection of fluid plastic material into the suitably temperature-controlled cavities 19a, 19b of mold portions 17a, 17b via respective orifices 20a, 20b. These orifices communicate with cylindrical injection chambers 21a, 21b within which two pistons $P_1$, $P_2$ are reciprocable by the drive mechanism in housing 12. The reciprocations of mold-supporting plate 14 and of injection pistons $P_1$, $P_2$ are controlled by a set of switches forming part of a timing circuit whose operation, to the extent relevant for the present invention, has been plotted graphically in FIG. 5 described hereinafter. One such switch 22 on the frame 10 coacts with a pointed cam 23 on plate 14 so as to close upon retraction of this plate into an open-mold position.

Mold portions 17a, 17b cooperate with two complementary mold portions 24', 24" which are carried on an arm 25 partaking of the horizontal reciprocations of plate 14. For this purpose, arm 25 is provided with a tubular hub 26 which is positively coupled with plate 14 by a key 27 and which slidably and rotatably surrounds the central tie bar 15c.

A collar 28 rigid with arm 25 coacts with a pair of lugs 29a, 29b serving to prevent separation of arm 25 from plate 14 during a swing of the arm about tie bar 15c; two radial slots 30 at diametrically opposite locations of collar 28 register with the lugs 29a, 29b in a horizontal position of arm 25 to facilitate disassembly for purposes of inspection or repair. In such horizontal position, the extremities of arm 25 are in contact with a pair of brackets 31a, 31b which hold the arm tightly clamped against spacers 32a, 32b rigid with plate 14 so that arm 25 and plate 14 effectively constitute a unitary structure. Brackets 31a and 31b, which in contradistinction to lugs 29a and 29b must resist considerable axial forces in withdrawing the arm along the tie bars during the opening of the mold, may have suitably rounded or beveled upper and lower edges to force the arm 25 into clamping engagement with these brackets upon its swing into either of its two horizontal positions.

The swinging of carrier arm 25 with its mold portions 24′, 24″ is effected by a hydraulic motor 33 whose shaft 34 carries a gear 35 meshing with another gear 36 on hub 26. Shaft 34 is also rigid with a cam 37 which, upon the arm 25 approaching either of its horizontal positions, trips a corresponding switch 38a or 38b which, in a manner described hereinafter with reference to FIG. 4, slows down the rotation of hydraulic motor 33 so that the final phase of the swing takes place at a reduced speed. At the end of this final phase, the descending extremity of arm 25 carrying mold portion 24″ comes to rest on a corresponding stop 39a or 39b (FIG. 3) which is pivoted at 40a, 40b to a bracket 41a, 41b rigid with support plate 14. A rod 42 articulatedly interlinks the two pivoted stops 39a and 39b, which are preferably designed as shock absorbers, in such manner that one stop (e.g. 39a) is swung out of the orbit of arm 25 while the other (e.g. 39b) is positioned to receive the impact of the descending extremity. When, starting from the position shown in FIG. 3, arm 25 swings clockwise through 180°, its ascending extremity in the final stage of the swing deflects the stop 39b into its alternate position (dot-dash lines), thereby erecting the other stop 39a underneath the descending extremity and approximately in line with the center of gravity of this descending extremity located in the region of the associated mold portion 24″. Upon the subsequent counterclockwise swing of arm 25, the extremity of arm 25 carrying mold portion 24′ resets the linkage 39a, 39b, 42 to the position shown in full lines in FIG. 3 just before the arm again reaches its horizontal position. Two switches $SWS_1$ and $SWS_2$ on brackets 31a and 31b close alternately, under the control of a cam 43 on arm 25, whenever the arm completes its 180° swing.

In order to lock the arm more positively in its horizontal position, a pin 44 (FIG. 1) biased rearwardly by a spring 45 projects from plate 14 in line with the plunger of a solenoid 46 so as to confront a bore 47′ or 47″ in the two extreme rotary positions of the arm. Pin 44, whose point is advantageously tapered to help correct slight deviations of the arm 25 from the horizontal, coacts with two limit switches, i.e. a "locking pin out" switch LPOS and a "locking pin in" switch LPIS. These switches, whose operation is more fully described hereinafter with reference to FIG. 5, prevent the operation of swing motor 33 while the pin 44 is thrust forward and inhibit mold closure as long as the pin is retracted.

The swingable mold portions 24′ and 24″ are of identical construction and, in the illustrated embodiment which is intended for the molding of cup-shaped articles, have projecting frustoconical cores 48′, 48″ which enter the recesses 19a and 19b of mold portions 17a and 17b to define the mold cavities. Recess 19a is slightly shallower and narrower than recess 19b and serves to form a first portion 49a′ or 49a″ of a molded article about the core 48′ or 48″ introduced into it during closure of the mold; recess 17b then adds a second portion 49b, in the form of an outer layer, to the previously molded inner layer 49a or 49a′. The two layers may consist for example, of red thermoplastic material injected through orifice 20a and blue thermoplastic material injected through orifice 20b. The two movable mold portions are provided with respective plungers 50′, 50″ (see also FIG. 3) for the ejection of a composite article 49 molded thereon. Each plunger 50 is seated in an axial bore of the corresponding mold portion, this bore having lateral flutes 51′, 51″ which define gas channels normally obstructed by an enlarged plunger head 52 as particularly illustrated for the plunger 50″ in FIGS. 1 and 2. A spring 53 urges the plunger 50′ and 50″ backward to hold the head 52 against its seat flush with the front face of core 48′ or 48″. A knockout rod 54 extends rearwardly from the plunger within ram 13b and is rigid with a piston 55 in a hydraulic or pneumatic cylinder 56. Rod 54, also biased rearwardly by a spring 57, coacts with a "knockout back" switch KBS and a "knockout forward" switch KFS which control the operation of a solenoid valve (not shown) for the admission of fluid to cylinder 56 to advance or retract the rod; switch KBS, in addition, insures that the mold carrier 25 does not start swinging until the knockout rod 54 has been returned to its retracted position.

A forward movement of rod 54, as illustrated in FIG. 2, mechanically detaches the molded article 49 from its core and also opens a path for the passage of a working fluid, such as compressed air, from an entrance port 58 (FIG. 1) through channels 51′ or 51″ to the interior of article 49 around head 52 whereby the article is fully dislodged from the core so as to drop into receptacle below or onto a conveyor (not shown).

Although the knockout rod 54 may be duplicated (without function) in ram 13a, no mechanism (such as elements 55, 56) would be provided on that side of the machine for displacing the plunger 50 if the machine is to be used exclusively for the molding of composite (e.g. two-color) articles.

In FIG. 4 I have illustrated a hydraulic system for two-speed operation of the swing motor 33 as briefly described above. A pump 61 delivers fluid from a reservoir 62 to a conduit 63 which is alternately connectable, through a sliding valve 64, with either of two conduits 65L (for leftward or counterclockwise swing) and 65R (for rightward or clockwise swing), the return path including a conduit 66 leading back to the reservoir. Motor 33 has two ports 67L, 67R connected with conduits 65L and 65R, respectively, via adjustable throttle valves 68L, 68R, check valves 69L, 69R and restricted by pass lines 70L, 70R. Two solenoids $S_L$ and $S_R$ are alternately energizable by a timing circuit, including switch 22 in the open mold position, to move the valve 64 either into the illustrated swing-left position or into the alternate swing-right position. Cam 37, illustrated diagrammatically in FIG. 4 without regard to its actual physical construction, alternately reduces the opening of throttle valve 68L or 68R via the aforedescribed switches 38a and 38b (FIG. 1).

In the position shown in FIG. 4, in which the shaft 34 of motor 33 has come to rest after a counterclockwise swing, valve 68R is partly closed whereas valve 68L is wide open. When the valve 64 is shifted to the right by energization of solenoid $S_R$, the previous direction of flow (solid arrows) is reversed (dot-dash arrows) and fluid streams from pump 61 via conduits 63, 65R, restricted passages 68R, 70R and, in parallel therewith, the forwardly unrestricted passage through check valve 69R, and port 67R into motor 33 which it leaves via port 67L, open valve 68L in parallel with passage 70L, and conduits 65L, 66 to return to reservoir 62. The liquid thus moves at a relatively high rate and motor 33 turns clockwise at high speed until cam 37 resets the throttle valve 68L to restrict its cross-section. The resulting flow reduction decelerates the motor 33 so that the final stage of the swing (e.g. the last 30° of the rotation) proceeds at a relatively slow rate. It will be apparent that the reopening of valve 68R by cam 37 in the early part of this swing is of virtually no significance owing to the bypass created by check valve 69R.

On the subsequent energization of solenoid $S_L$, a counterclockwise two-speed rotation of motor 33 occurs in an analogous manner.

In FIG. 5 I have diagrammatically illustrated the operation of control switches $SWS_1$, $SWS_2$, LPOS, LPIS, KBS and KFS during two successive complete molding cycles along with the movements of mold portions 24', 24", pistons $P_1$, $P_2$, swingable arm 25, knockout rod 54 and locking pin 44 under the control of the timer. At time $t_0$, mold portions 24', 24" are in their closed position (support 14 forward) and injection is about to begin. Arm 25 is assumed to occupy the position shown in FIG. 3 so that switch $SWS_1$ is open and switch $SWS_2$ is closed. Locking pin 44 is in its bore 47' so that switch LPOS is open and switch LPIS is closed. Knockout rod 54 is retracted, closing switch KBS and keeping switch KFS open.

Immediately therafter, piston $P_1$ moves forward (to the left in FIG. 1), followed with a slight delay by piston $P_2$. This relative staggering of the injection strokes of the two pistons, brought about by a suitable adjustment of the timer, is resorted to when the two constituents to be molded in cavities 19a and 19b take different times to harden, e.g. when layer 49b is thinner and therefore sets more quickly than layer 49a'. The return strokes of the two pistons, however, occur simultaneously and are followed by the opening of both molds.

As soon as the mold support 14 has been fully retracted, switch 22 (FIG. 1) trips the solenoid valve associated with cylinder 56 so that rod 54 moves forward at time $t_1$, opening the switch KBS and shortly thereafter, closing momentarily the switch KFS to reverse the solenoid valve and return the rod 54 to normal, thereby reclosing switch KBS. Upon this reclosure, at time $t_2$, solenoid 46 (FIG. 1) is energized to retract locking pin 44 with resultant opening of switch LPIS followed immediately by the closure of switch LPOS which permits the energization of solenoid $S_R$ (FIG. 4) to swing the arm 25 to the right (i.e., clockwise) as viewed in FIG. 3. This swing, as indicated in FIG. 5, occurs at a relatively fast rate between times $t_3$ and $t_4$, continuing then at a slower rate and ending at time $t_5$. At this point the solenoid 46 (FIG. 1) is de-energized, locking pin 44 enters the bore 47" and switch LPOS opens while switch LPIS closes an instant later. Switch $SWS_2$ having opening at the beginning of the swing (time $t_3$), switch $SWS_1$ now closes at time $t_5$. Mold portions 24', 24" are moved forward into close position and at time $t_0'$ the stage is set for another operating cycle which, except for the positions of switches $SWS_1$ and $SWS_2$, is identical with the one previously described. Thus, after reciprocation of pistons $P_1$ and $P_2$, the molds are reopened and at time $t_1'$ the knockout rod 54 moves forward to eject the molded article, locking pin 44 is withdrawn at time $t_2'$, mold carrier 25 swings to the left at high speed during the interval $t_3'-t_4'$ and at low speed during the interval $t_4'-t_5'$, and the system returns to its initial position at $t_0''$.

It may be mentioned that the machine described and illustrated may be readily modified for the manufacture of unitary rather than composite articles by a de-activation of the mold-swinging mechanism (e.g., by open-circulating the solenoid 46), with concurrent de-activation of injection piston $P_1$ or with activation of a second knockout rod in ram 13a to operate simultaneously with rod 54.

I claim:

1. An injection-molding machine comprising a first and a second mold portion disposed alongside each other; a pair of interchangeable mold portions each having an article-retaining formation adapted to define with either of said first and second mold portions a mold with at least one cavity; first and second injection means respectively connected with said first and second mold portions for actuation in a closed position of the corresponding molds; a support reciprocable toward and away from said first and second mold portions; a carrier pivotally journaled on said support for swinging about an axis between two diametrically opposite positions in an open position of said molds, said axis extending in the direction of reciprocation of said support, said interchangeable mold portions being mounted on diametrically opposite ends of said carrier for alternately confronting said first and second mold portions; detent means operable in each of said diametrically opposite positions for locking said carrier against swinging movement; drive means for reciprocating said carrier along said axis in an operative position of said detent means; mechanism for swinging said carrier about said axis from one of said diametrically opposite positions into the other in an inoperative position of said detent means; ejector means disposed for alternate alignment with said interchangeable mold portions for removing therefrom a composite article molded in successive injections via said first and second mold portions; and a pair of stop means for respectively arresting said carrier in said diametrically opposite positions, each of said stop means being positionable for engagement with said carried at a location substantially in line with one of said interchangeable mold portions, each of said stop means being deflectable by said carrier out of the path thereof during a return swing immediately following such engagement.

2. A machine as defined in claim 1 wherein said stop means are interlinked with joint displacement by the carrier into a deflected and an aligned position, respectively.

3. A machine as defined in claim 1 wherein said stop means are shock absorbers.

4. An injection-molding machine comprising a first and second mold portion disposed alongside each other; a pair of interchangeable mold portions each having an article-retaining formation adapted to define with either of said first and second mold portions a mold with at least one cavity; first and second injection means respectively connected with said first and second mold portions for actuation in a closed position of the corresponding molds; a support reciprocable toward and away from said first and second mold portions; a carrier pivotally journaled on said support for swinging about an axis between two diametrically opposite positions in an open position of said molds, said axis extending in the direction of reciprocation of said support, said interchangeable mold portions being mounted on diametrically opposite ends of said carrier for alternately confronting said first and second mold portions; detent means operable in each of said diametrically opposite positions for locking said carrier against swinging movement; drive means for reciprocating said carrier along said axis in an operative position of said detent means; mechanism for swinging said carrier about said axis from one of said diametrically opposite positions into the other in an inoperative position of said detent means; and ejector means disposed for alternate alignment with said interchangeable mold portions for removing therefrom a composite article molded in successive injections via said first and second mold portions; said mechanism including resetting means trippable by said carrier in an intermediate swing zone for shifting from a relatively high-speed rotation of said carrier into a relatively low-speed rotation thereof.

5. A machine as defined in claim 4 wherein said carrier has a shaft in line with said axis provided with a rotatable cam, said mechanism comprising a hydraulic motor coupled with said shaft, said resetting means including hydraulic valve means operatively connected with said cam for throttling the flow of operating fluid to said motor upon rotation of said shaft past said intermediate swing zone.

6. A machine as defined in claim 5 wherein said hydraulic valve means comprises a first valve actuatable by said cam in a terminal phase of a swing in one direction and a second valve actuatable by said cam in a terminal phase of a swing in the opposite direction.

7. An injection-molding machine comprising a first and a second mold portion disposed alongside each other; a pair of interchangeable mold portions each having an article-retaining formation adapted to define with either of said first and second mold portions a mold with at least one cavity; first and second injection means respectively connected with said first and second mold portions for actuation in a closed position of the corresponding molds; a support reciprocable toward and away from said first and second mold portions; a carrier pivotally journaled on said support for swinging about an axis between two diametrically opposite positions in an open position of said molds, said axis extending in the direction of reciprocation of said support, said interchangeable mold portions being mounted on diametrically opposite ends of said carrier for alternately confronting said first and second mold portions; detent means on said support engageable with a respective coating formation on said carrier in each of said diametrically opposite positions for locking said carrier against swinging movement; drive means for reciprocating said carrier along said axis in an engaged position of said detent means; mechanism for swinging said carrier about said axis from one of said diametrically opposite positions into the other in a disengaged position of said detent means; ejector means including an axially reciprocable rod in line with said second mold portion for removing therefrom a composite article molded in successive injections; first switch means on said support actuated by said detent means in said disengaged position for inhibiting the operation of said drive means; and second switch means on said support actuated by said detent in said engaged position for inhibiting the operation of said mechanism.

8. A machine as defined in claim 7 wherein each of said interchangeable mold portions has its said article-retaining formation provided with a normally retracted head limitedly movable under fluid pressure from said source into a projecting position, said head in its projecting position defining with said formation a gap for the passage of said fluid to complete the dislodgment of said molded composite article.

9. A machine as defined in claim 7, further comprising timer means for staggered inception and substantially simultaneous termination of the operation of said first and second injection means.

10. A machine as defined in claim 7 wherein said carried is provided with an eccentric aperture aligned with said rod for traverse thereby in one of said diametrically opposite positions.

11. A machine as defined in claim 10, further comprising third switch means controlled by said ejector means for inhibiting operation of said mechanism in any but a retracted position of said rod.

References Cited
UNITED STATES PATENTS

| | | | |
|---|---|---|---|
| 2,333,056 | 10/1943 | Thoreson et al. | 18—30 |
| 2,226,408 | 12/1940 | Nast | 18—30 |
| 2,333,059 | 10/1943 | Tucker | 18—30 |
| 2,790,995 | 5/1957 | Heater | 18—30 |
| 2,860,374 | 11/1958 | Harrison et al. | |

WILBUR L. McBAY, Primary Examiner

U.S. Cl. X.R.

18—2, 5, 20